(12) United States Patent
Li

(10) Patent No.: US 10,409,757 B2
(45) Date of Patent: Sep. 10, 2019

(54) HUB

(71) Applicant: SIMPOWER TECHNOLOGY INC., Taipei (TW)

(72) Inventor: Dong-Sheng Li, Taipei (TW)

(*) Notice: Subject to any disclaimer, the term of this patent is extended or adjusted under 35 U.S.C. 154(b) by 58 days.

(21) Appl. No.: 15/818,788

(22) Filed: Nov. 21, 2017

(65) Prior Publication Data

US 2018/0143934 A1 May 24, 2018

Related U.S. Application Data

(60) Provisional application No. 62/425,618, filed on Nov. 23, 2016.

(51) Int. Cl.
| | |
|---|---|
| G06F 1/26 | (2006.01) |
| G06F 13/38 | (2006.01) |
| G06F 13/40 | (2006.01) |
| G06F 13/42 | (2006.01) |

(52) U.S. Cl.
CPC .......... *G06F 13/4081* (2013.01); *G06F 1/266* (2013.01); *G06F 13/385* (2013.01); *G06F 13/4282* (2013.01); *G06F 2213/0042* (2013.01)

(58) Field of Classification Search
CPC ............... G06F 13/4081; G06F 13/385; G06F 13/4282; G06F 1/266; G06F 2213/0042
See application file for complete search history.

(56) References Cited

U.S. PATENT DOCUMENTS

2004/0019732 A1 1/2004 Overtoom et al.
2008/0005262 A1 1/2008 Wurzburg et al.
2016/0110305 A1 4/2016 Singh et al.
2017/0308498 A1* 10/2017 Chen ..................... G06F 13/385
2017/0344512 A1* 11/2017 Jen ....................... G06F 13/4068

FOREIGN PATENT DOCUMENTS

| CN | 105608035 | 5/2016 |
|---|---|---|
| TW | 200723060 | 6/2007 |
| TW | M525481 | 7/2016 |

OTHER PUBLICATIONS

VESA ;DisplayPort Alt Mode for USB Type-C Standard; Sep. 22, 2014.*
Choate, "VESA-DisplayPortTM Alternate Mode on USB-CTM-Technical Overview", p. 12, 17, 18 and 22, Sep. 27, 2016.

* cited by examiner

*Primary Examiner* — Ernest Unelus
*Assistant Examiner* — Ronald T Modo

(57) ABSTRACT

The hub is electrically connected to a first electronic device and a display outside the hub. The hub comprises a circuit board, a MCU, a front type-C transmission line, a first USB type-C output terminal, a first input controller, a first output controller, a first output multiplexer and a USB hub processor. The front type-C transmission line comprises a power transmission line, a first data transmission line set and a second data transmission line set. The first USB type-C output terminal is electrically connected between the power transmission line and the first type-C transmission line. The first input controller is disposed on the circuit board and electrically connected to the MCU and the first electronic device. The first output controller is disposed on the circuit board and electrically connected between the MCU and the first USB type-C output terminal. A connecting status of the first type-C transmission line and the first USB type-C output terminal is detected by the first output controller.

18 Claims, 9 Drawing Sheets

HUB

BACKGROUND OF THE INVENTION

Field of the Invention

The present invention relates to a hub, more particularly to a hub fbeing to support an alternate mode.

Description of Related Art

At present, some of the laptops only include one USB Type-C terminal being as port in order to reduce its volume. This is because the USB Type-C terminal could transmit not only general data (a Non-video signal) but also a video signal via a USB Type-C to DisplayPort Cable. Please refer to FIG. 1A. FIG. 1A illustrates a USB Type-C to DisplayPort Cable. In other words, the USB Type-C terminal transmits the video signal with an alternate mode. However, only one USB port is not enough for using. Thus, a USB Hub 10 including a video output terminal could be used to extend the USB port. Please refer to FIG. 1B. FIG. 1B illustrates a schematic diagram of a USB hub 10 connected with an external device. The video signal and the Non-video signal of the laptops are separated by the USB hub 10. Afterward the video signal of the laptops could be transmitted to a display via a DisplayPort terminal 101 of the USB hub 10, and the Non-video signal of the laptops could be transmitted via a USB Type-C port 102 of the USB hub 10.

However, because the video signal and the Non-video signal have been separated by the USB hub 10, the video signal could not be transmitted via the USB Type-C port 102 when the USB Type-C to DisplayPort Cable 8 is connected to the USB Type-C port 102. As a result, this situation will also cause inconvenience for using the USB hub 10 because using the USB Type-C to DisplayPort Cable 8 could not transmit the video signal in the USB hub 10. In other words, the traditional USB hub 10 cannot be used to support the alternate mode.

Therefore, how to improve on the above problems and developing a hub being to support the alternate mode is worth considering to a person having ordinary skills in the art.

SUMMARY OF THE INVENTION

The purpose of the present invention is to provide a hub which can be used to support an alternate mode.

The hub is electrically connected to a first electronic device and a display outside the hub, and the display is connected to the hub via a first type-C transmission line. The hub comprises a circuit board, a MCU, a front type-C transmission line, a first USB type-C output terminal, a first input controller, a first output controller, a first output multiplexer and a USB hub processor. The MCU is disposed on the circuit board. The front type-C transmission line is electrically connected to the first electronic device. The front type-C transmission line comprises a power transmission line, a first data transmission line set and a second data transmission line set. The power transmission line, the first data transmission line set and the second data transmission line set are extended on the circuit board. The first USB type-C output terminal is electrically connected between the power transmission line and the first type-C transmission line. The first input controller is disposed on the circuit board and electrically connected to the MCU and the first electronic device. The first output controller is disposed on the circuit board and electrically connected between the MCU and the first USB type-C output terminal. A connecting status of the first type-C transmission line and the first USB type-C output terminal is detected by the first output controller. A first output multiplexer is disposed on the circuit board and electrically connected to the MCU and the first data transmission line set. An output terminal of the first output multiplexer is electrically connected to the first USB type-C output terminal. A USB hub processor is connected between the second data transmission line set and the first output multiplexer, wherein when the connecting status of the first type-C transmission line and the first USB type-C output terminal is transmitted to the MCU by the first output controller, the first output multiplexer is adjusted by the MCU to determine the individual data path of transmission.

The purpose of the present invention is to provide another hub. The hub is electrically connected to a first electronic device and a display which are outside the hub. The first electronic device is connected to the hub via a second type-C transmission line. The display is connected to the hub via a first type-C transmission line. The hub comprises a circuit board, a MCU, a USB type-C input terminal, a first USB type-C output terminal, a first input controller, a first input multiplexer, a first output controller, a first output multiplexer and a USB hub processor. The MCU is disposed on the circuit board. The USB type-C input terminal includes a power transmission line, a first data transmission line set and a second data transmission line set extended on the circuit board. The USB type-C input terminal is electrically connected to the second type-C transmission line. The first USB type-C output terminal is electronic connected to the power transmission line and the first type-C transmission line. The first input controller is disposed on the circuit board and electrically connected to the MCU and the USB type-C input terminal. A connecting status of the second type-C transmission line and the USB type-C input terminal is detected by the first input controller. The first input multiplexer is disposed on the circuit and electrically connected to the MCU, the first data transmission line set and the second data transmission line set. The first output controller is disposed on the circuit board and electrically connected between the MCU and the first USB type-C output terminal. The connecting status of the first type-C transmission line and the first USB type-C output terminal is detected by the first output controller. The first output multiplexer is disposed on the circuit board and electrically connected to the MCU and the first input multiplexer. An output terminal of the first output multiplexer is electrically connected to the first USB type-C output terminal. A USB hub processor is electrically connected between the first input multiplexer and the first output multiplexer. Wherein when the connecting status of the second type-C transmission line and the USB type-C input terminal is transmitted to the MCU by the first input controller, the first input multiplexer is adjusted by the MCU, and when the connecting status of the first type-C transmission line and the first USB type-C output terminal is transmitted to the MCU by the first output controller, the first output multiplexer is adjusted by the MCU to determine the individual data path of transmission.

The foregoing, as well as additional objectives, features, and advantages of the present invention will be more readily apparent from the following detailed description, which proceeds with reference to the accompanying drawings.

DETAILED DESCRIPTION OF THE INVENTION

Figure 2A:
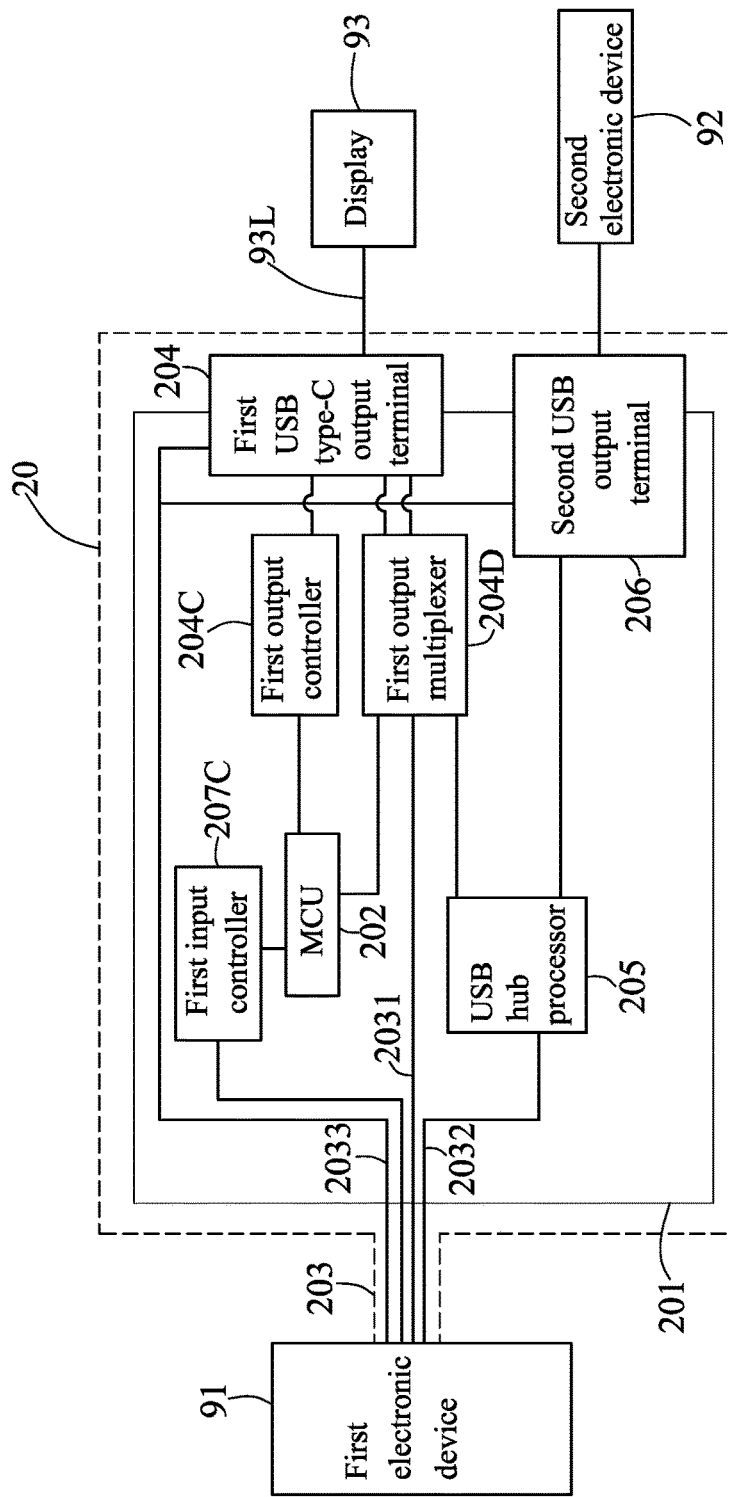
FIG. 2A illustrates a schematic diagram of a hub 20 in accordance with first embodiment of the present invention.
Figure 2B:
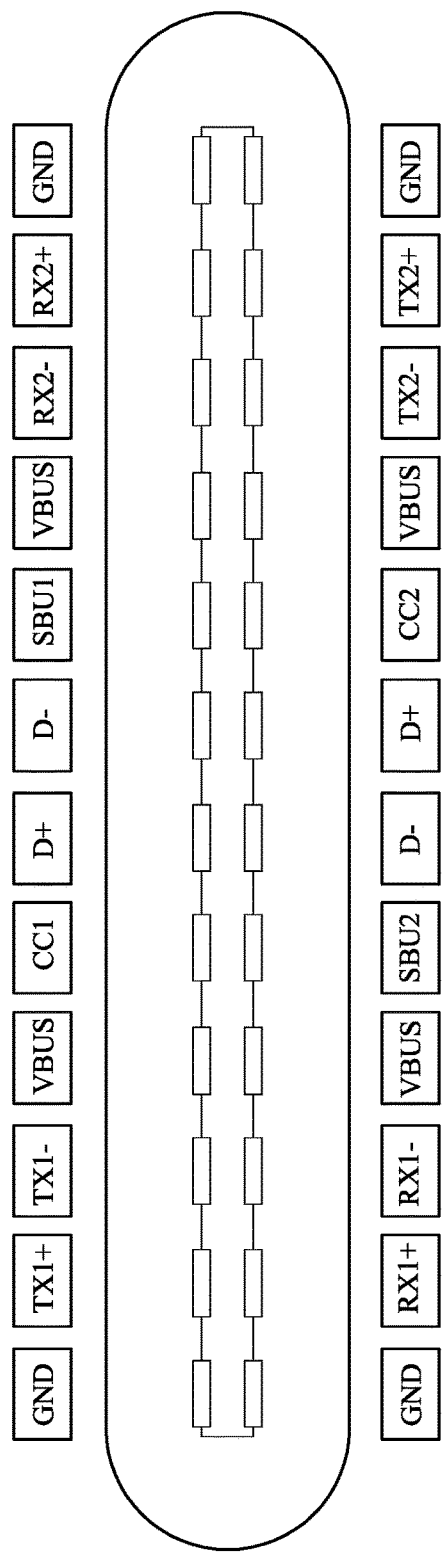
FIG. 2B illustrates a schematic diagram of pins of a USB type-C port and a name of the pins.

Please refer to FIG. 2A and FIG. 2B. FIG. 2A illustrates a schematic diagram of a hub 20 in accordance with first embodiment of the present invention. FIG. 2B illustrates a schematic diagram of pins of a USB type-C port and names of the pins. The hub 20 is electrically connected to a first electronic device 91, a second electronic device 92 and a display 93 which are outside the hub 20. The display 93 is electrically connected to the hub 20 via a first type-C transmission line 93L. For example, the first type-C transmission line 93L is a USB Type-C to DisplayPort Cable. The hub 20 comprises a circuit board 201, a MCU 202, a front type-C transmission line 203, a first USB type-C output terminal 204, a first input controller 207C, a first output controller 204C, a first output multiplexer 204D, a USB hub processor 205 and a second USB output terminal 206. The MCU 202 is disposed on the circuit board 201. The front type-C transmission line 203 is electrically connected to the first electronic device. The second USB output terminal 206 is electrically connected to the second electronic device 92 being outside the hub 20 and connected to the USB hub processor 205. Furthermore, the front type-C transmission line 203 comprises a power transmission line 2033, a first data transmission line set 2031 and a second data transmission line set 2032. The power transmission line 2033 is connected to four VBUS pins of the USB type-C port for transmitting the electricity. The first data transmission line set 2031 is connected to a SSTXp2 pin, a SSTXn2 pin, a SSRXp2 pin and SSRXn2 pin of the USB type-C port for transmitting the SuperSpeed differential-signal. In the present embodiment, the first data transmission line set 2031 is configured to transmit a video signal of first electronic device 91. The second data transmission line set 2032 is connected to a SSRXn1 pin, SSRXp1 pin, SSTXn1 pin and SSTXp1 pin of the USB type-C port for transmitting the SuperSpeed differential-signal. In the present embodiment, the second data transmission line set 2032 is configured to transmit a Non-video signal of first electronic device 91. The power transmission line 2033, the first data transmission line set 2031 and the second data transmission line set 2032 are extended on the circuit board. In the above, the hub 20 could use a Dongle device to be connected to the display 93 besides using the first type-C transmission line 93L.

In addition, the first input controller 207C is disposed on the circuit board 201 and electrically connected to the MCU 202 and the first electronic device 91. The first input controller 207C is configured to confirm if the first electronic device 91 is to support an alternate mode. Moreover, the first input controller 207C could request that the first electronic device 91 transmits the video signal.

Figure 1A:
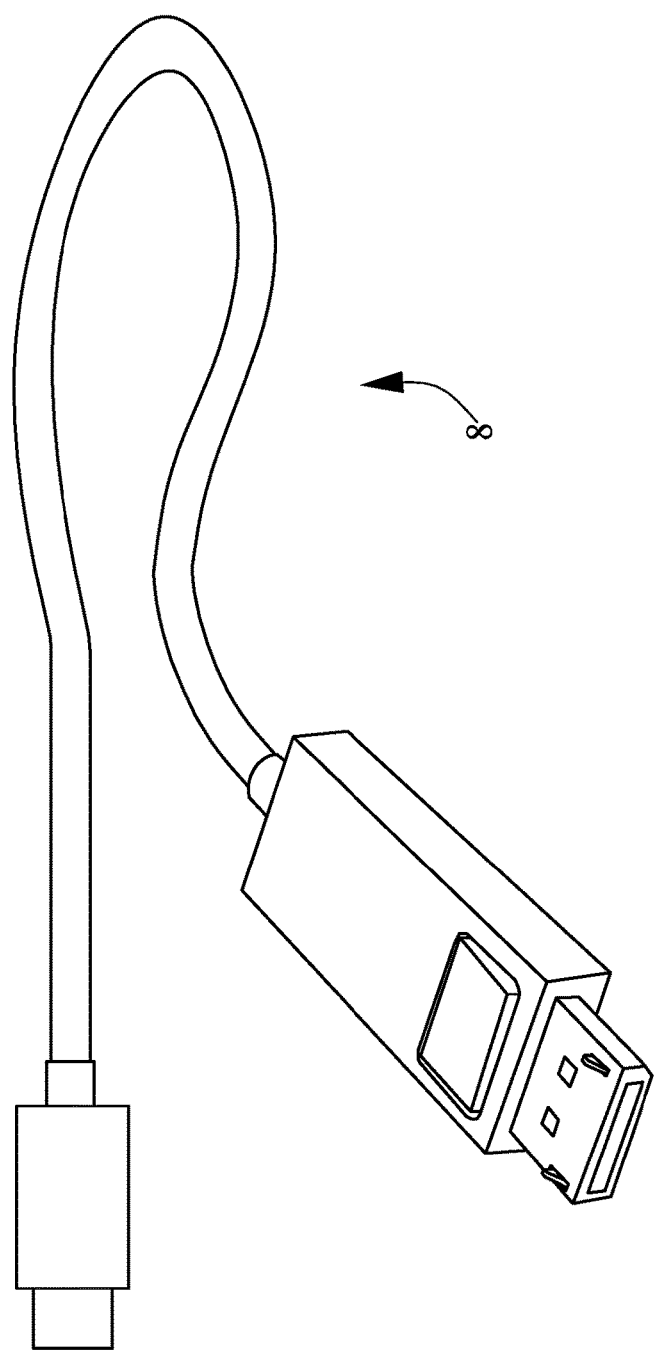
FIG. 1A illustrates a USB Type-C to DisplayPort Cable.
Figure 1B:
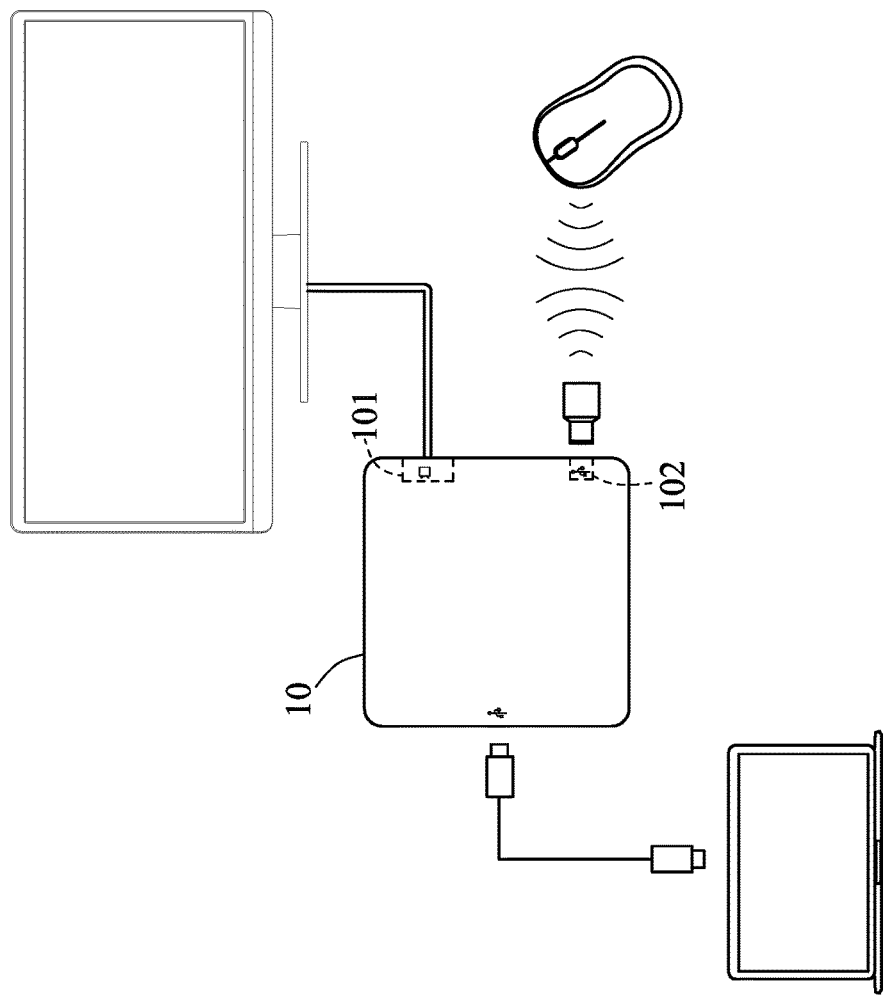
FIG. 1B illustrates a schematic diagram of a USB hub 10 connected with an external device.

Furthermore, the first USB type-C output terminal 204 is electrically connected to the power transmission line 2033 and the first type-C transmission line 93L. The first output controller 204C is disposed on the circuit board 201 and electrically connected between the MCU 202 and the USB type-C output terminal 204. The first output controller 204C is communicated with the display 93 via a CC pin of the first type-C transmission line 93L to detect a connecting status of the first type-C transmission line 93L and the USB type-C output terminal 204. In other words, the first output controller 204C could detect if the first type-C transmission line 93L is connected or upside-down connected to the USB type-C output terminal 204. Moreover, the first output multiplexer 204D is also disposed on the circuit board 201. An input terminal of the first output multiplexer 204D is electrically connected to the MCU 202 and the first data transmission line set 2031, so the video signal could be transmitted to the first output multiplexer 204D. Besides, the USB hub processor 205 is electrically connected to the second data transmission line set 2032 and the first output multiplexer 204D, so the Non-video signal could be transmitted to the first output multiplexer 204D via the USB hub processor 205. In addition, an output terminal of the first output multiplexer 204D is electrically connected to the USB type-C output terminal 204, so the video signal and the Non-video signal would be transmitted to the first USB type-C output terminal 204. As a result, when the first type-C transmission line 93L is connected to the first USB type-C output terminal 204, the video signal is transmitted to the display 93 via the first USB type-C output terminal 204 and the first type-C transmission line 93L. Compared with the hub 10 in FIG. 1B, the first USB type-C output terminal 204 of the hub 20 in the present embodiment could transmit the video signal. Thus, the hub 20 is to support the alternate mode. Furthermore, when the hub 20 is connected to the display 93, the video signal of the hub could also be transmitted to the display 93. In the art, the MCU 202, the first input controller 207C and the first output controller 204C would be assembled in a single chip to form a control circuit.

Figure 2C:
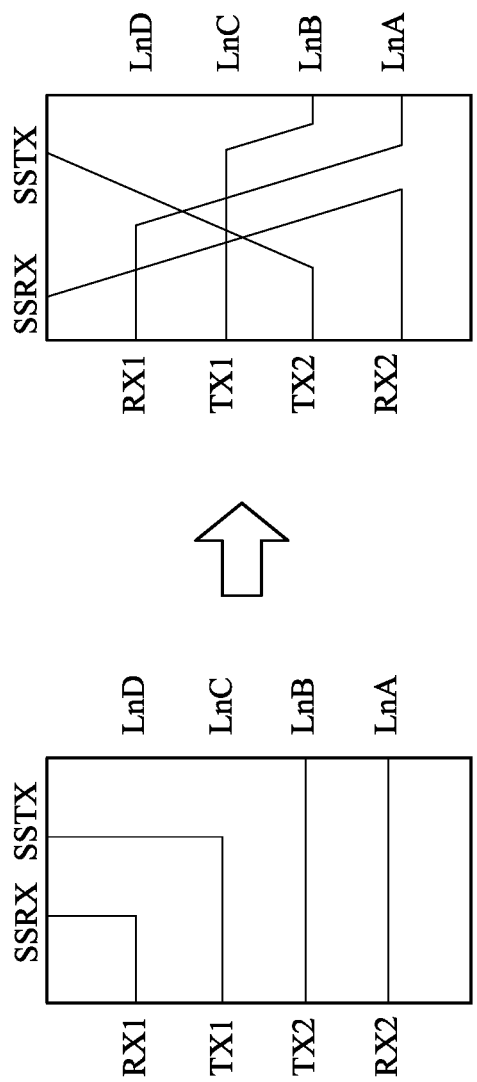
FIG. 2C illustrates a schematic diagram of the first output multiplexer 204D switching a signal of the first USB type-C output terminal 204.

In the above, when the connecting status of the first type-C transmission line 93L and the first USB type-C output terminal 204 is transmitted to the MCU 202 by the first output controller 204C, the first output multiplexer 204D is adjusted by the MCU 202. In details, when the first type-C transmission line 93L is reversely connected to the first USB type-C output terminal 204, a signal of the first USB type-C output terminal 204 is switched by the adjusted first output multiplexer 204D. Please refer to FIG. 2C. FIG. 2C illustrates a schematic diagram of the first output multiplexer 204D switching a signal from the first USB type-C output terminal 204. In other words, a signal from RX1 pin and TX1 pin is transmitted to LnB pin and LnA pin, and the signal would be used as the alternate mode. A signal from RX2 pin and TX2 pin (RX2 pin and TX2 pin is another group.) is transmitted to SSRX pin and SSTX pin, i.e. transmitting to a Hub controller. Therefore, the first type-C transmission line 93L could receive the video signal and the Non-video signal transmitted by the first USB type-C output terminal 204 when the first type-C transmission line 93L is connected or upside-down connected to the USB type-C output terminal 204.

It should be noted that the name and function of every pin of the USB type-C port is an ordinary knowledge of a person having ordinary skills in the art, or could be found out via searching public information (e.g., Wikipedia; website: https://zh.wikipedia.org/wiki/USB_Type-C). Therefore, in the present specification, it only introduces pins of the USB type-C port relating with the technology in the present invention.

Figure 3:
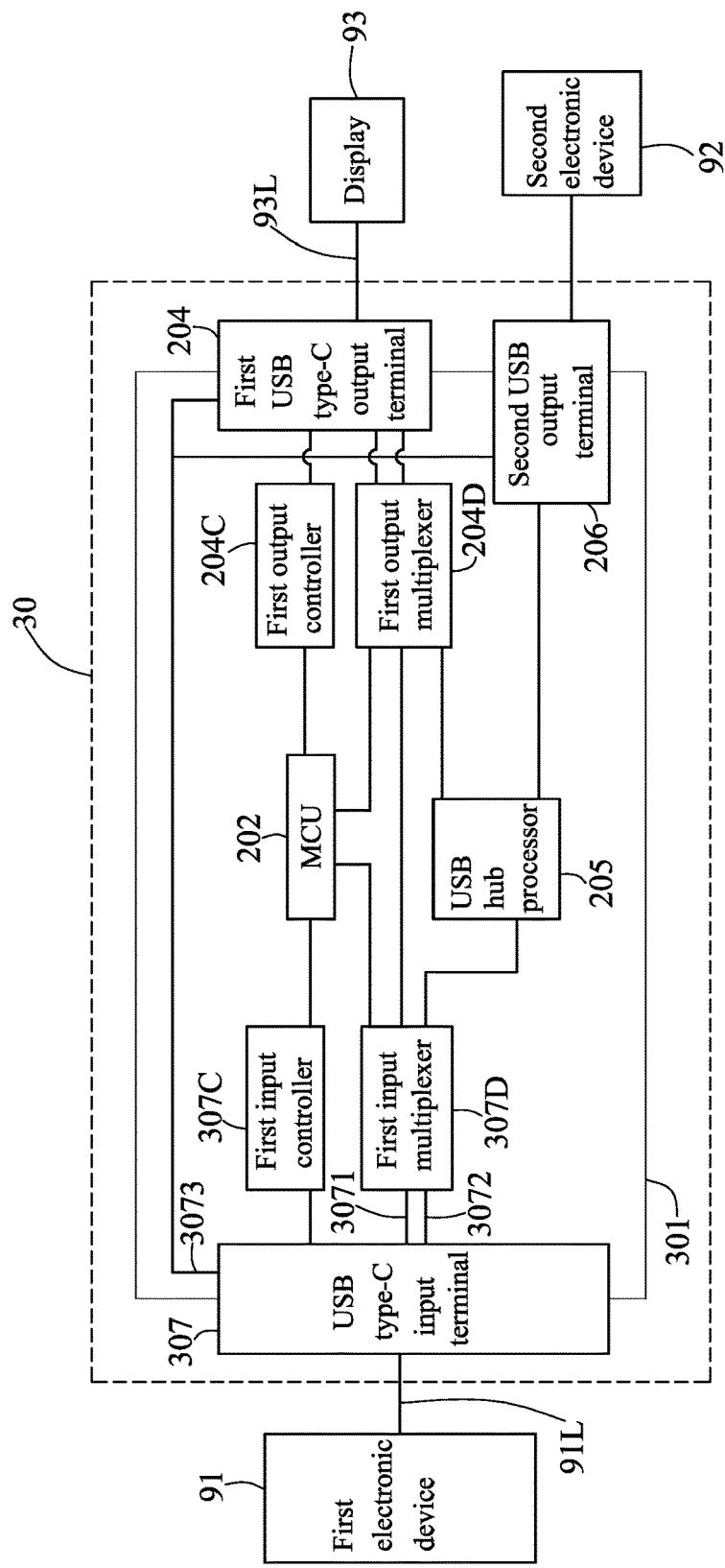
FIG. 3 illustrates a schematic diagram of a hub 30 with second embodiment of the present invention.

Please refer to FIG. 3. FIG. 3 illustrates a schematic diagram of a hub 30 with second embodiment of the present invention. The difference between the hub 30 and the hub 20 is the hub 30 further includes a USB type-C input terminal 307 and a first input multiplexer 307D, and the first input controller 207C of the hub 20 is replaced with the first input controller 307C. However, the hub 30 does not include the front type-C transmission line 203. Besides, the first electronic device 91 is electrically connected to the USB type-C input terminal 307 of the hub 30 via a second type-C transmission line 91L. For example, the second type-C transmission line 91L is such as a USB Type-C to Type-C Cable. Therefore, the video signal and the Non-video signal of the first electronic device 91 is transmitted to the USB type-C input terminal 307 via the second type-C transmission line 91L. The USB type-C input terminal 307 including a power transmission line 3073, a first data transmission line set 3071 and a second data transmission line set 3072 is extended on the circuit board 301. The power transmission line 2033 is connected to four VBUS pins (Please refer to FIG. 2B again.) of the USB type-C port for transmitting the electricity. The first data transmission line set 3071 is connected to a SSTXp2 pin, a SSTXn2 pin, a SSRXp2 pin and SSRXn2 pin (As shown in FIG. 2B) of the USB type-C port for transmitting the SuperSpeed differential-signal. In the present embodiment, the first data transmission line set 3071 is configured to transmit a video signal of first electronic device 91. The second data transmission line set 3072 is connected to a SSRXn1 pin, SSRXp1 pin, SSTXn1 pin and SSTXp1 pin (As shown in FIG. 2B) of the USB type-C port for transmitting the SuperSpeed differential-signal. In the present embodiment, the second data transmission line set 3072 is configured to transmit a Non-video signal of first electronic device 91. In addition, the first input controller 307C is disposed on the circuit board 301 and electrically connected to the MCU 202 and the USB type-C input terminal 307. The first input controller 307C is communicated with the first electronic device 91 via a CC pin of the second type-C transmission line 91L to detect a connecting status of the second type-C transmission line 91L and the USB type-C input terminal 307. In other words, the first output controller 307C could detect if the second type-C transmission line 91L is connected or upside-down connected to the USB type-C input terminal 307. Moreover, in the art, the MCU 202, the first input controller 307C and the first output controller 204C could be integrated in a single chip. Furthermore, the first input multiplexer 307D is disposed on the circuit 301 and electrically connected to the MCU 202, the first data transmission line set 3071, the second data transmission line set 3072 and the input terminal of the first output multiplexer 204D, and the USB hub processor 205 is electrically connected between the first input multiplexer 307D and the first output multiplexer 204D. Because the input terminal of the first input multiplexer 204D is electrically connected to the first input multiplexer 307D electrically connected to the first data transmission line set 3071, the first input multiplexer 204D could receive the video signal via the first data transmission line set 3071 and the first input multiplexer 307D. In addition, because the USB hub processor 205 is electrically connected between the first input multiplexer 307D and the first input multiplexer 204D, and the first input multiplexer 204D is electrically connected the second data transmission line set 3072, so the first input multiplexer 204D could also receive the Non-video signal via the USB hub processor 205. Furthermore, the output terminal of the first input multiplexer 204D is electrically connected to the first USB type-C output terminal 204, so the video signal and the Non-video signal of the first electronic device 91 are transmitted to the first USB type-C output terminal 204. Therefore, when the first type-C transmission line 93L is connected to the first USB type-C output terminal 204, the video signal is transmitted to the display 93. As a result, the hub 30 of the second embodiment is to support the alternate mode.

In the above, when the connecting status of the second type-C transmission line 91L and the USB type-C input terminal 307 is transmitted to the MCU 202 by the first input controller 307C, the first input multiplexer 307D is adjusted by the MCU 202. That is similar to a signal switching mode of FIG. 2C. The signal switching mode is a signal of the first USB type-C input terminal 307 is switched by the first input multiplexer 307D. Therefore, the first USB type-C input terminal 307 could receive the video signal and the Non-video signal transmitted by the second type-C transmission line 91L when the second type-C transmission line 91L is connected or upside-down connected to the first USB type-C input terminal 307.

Figure 4:
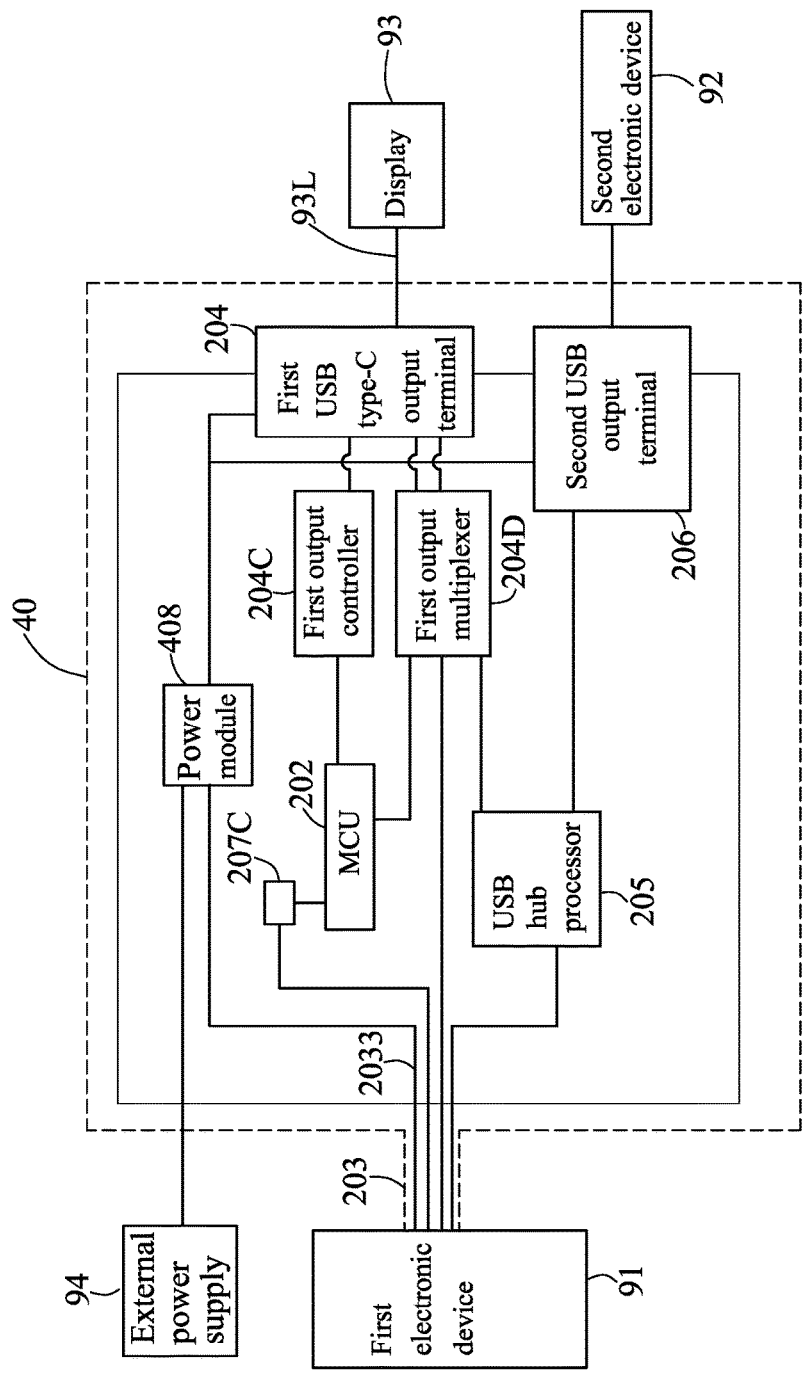
FIG. 4 illustrates a schematic diagram of a hub 40 with third embodiment of the present invention.

Please refer to FIG. 4. FIG. 4 illustrates a schematic diagram of a hub 40 with third embodiment of the present invention. The difference between the hub 40 and the hub 20 is the hub 40 further comprises a power module 408 electrically connected to an external power supply 94 being outside the hub 40. The external power supply is an AC power or a DC power. Besides, the power module 408 is also electrically connected to the power transmission line 2033, the first USB type-C output terminal 204 and the second USB output terminal 206. The first electronic device 91, the second electronic device 92 and the display 93 are powered by the external power supply 94 via the power module 408. As a result, the first electronic device 91, the second electronic device 92 and the display 93 are operating stably. In the above, more detailed features of the power module 408 could refer to U.S. patent application Ser. No. 15/176,260 "MULTI-FUNCTIONAL HUB INTEGRATED WITH AC POWER SUPPLY".

Figure 5:
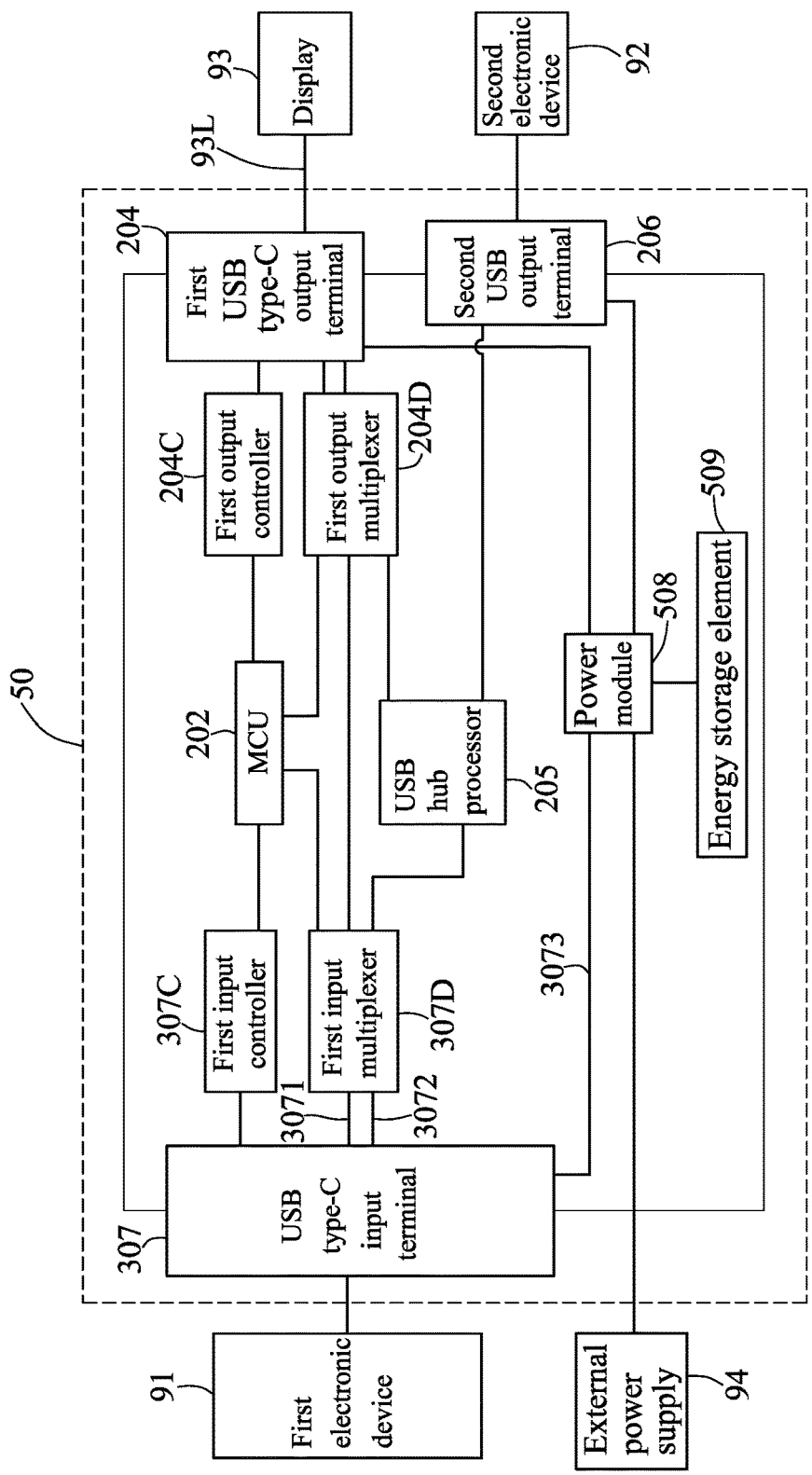
FIG. 5 illustrates a schematic diagram of a hub 50 with fourth embodiment of the present invention.

Please refer to FIG. 5. FIG. 5 illustrates a schematic diagram of a hub 50 with fourth embodiment of the present invention. The difference between the hub 50 and the hub 30 is the hub 50 further comprises a power module 508 and an energy storage element 509. The power module 508 is electrically connected to an external power supply 94 being outside the hub 50. Besides, the power module 508 is also electrically connected to the power transmission line 3073, the first USB type-C output terminal 204 and the second USB output terminal 206. The first electronic device 91, the second electronic device 92 and the display 93 are powered by the external power supply 94 via the power module 508. Furthermore, the energy storage element 509 is electrically connected the power module 508. When the power module 508 is powered by the external power supply 94, the energy storage element 509 is in a charging mode. On the contrary, when the power module 508 is not powered by the external power supply 94, the energy storage element 509 is in a power supply mode. As a result, the first electronic device 91, the second electronic device 92 and the display 93 are powered by the energy outputted from the energy storage element 509.

Figure 6:
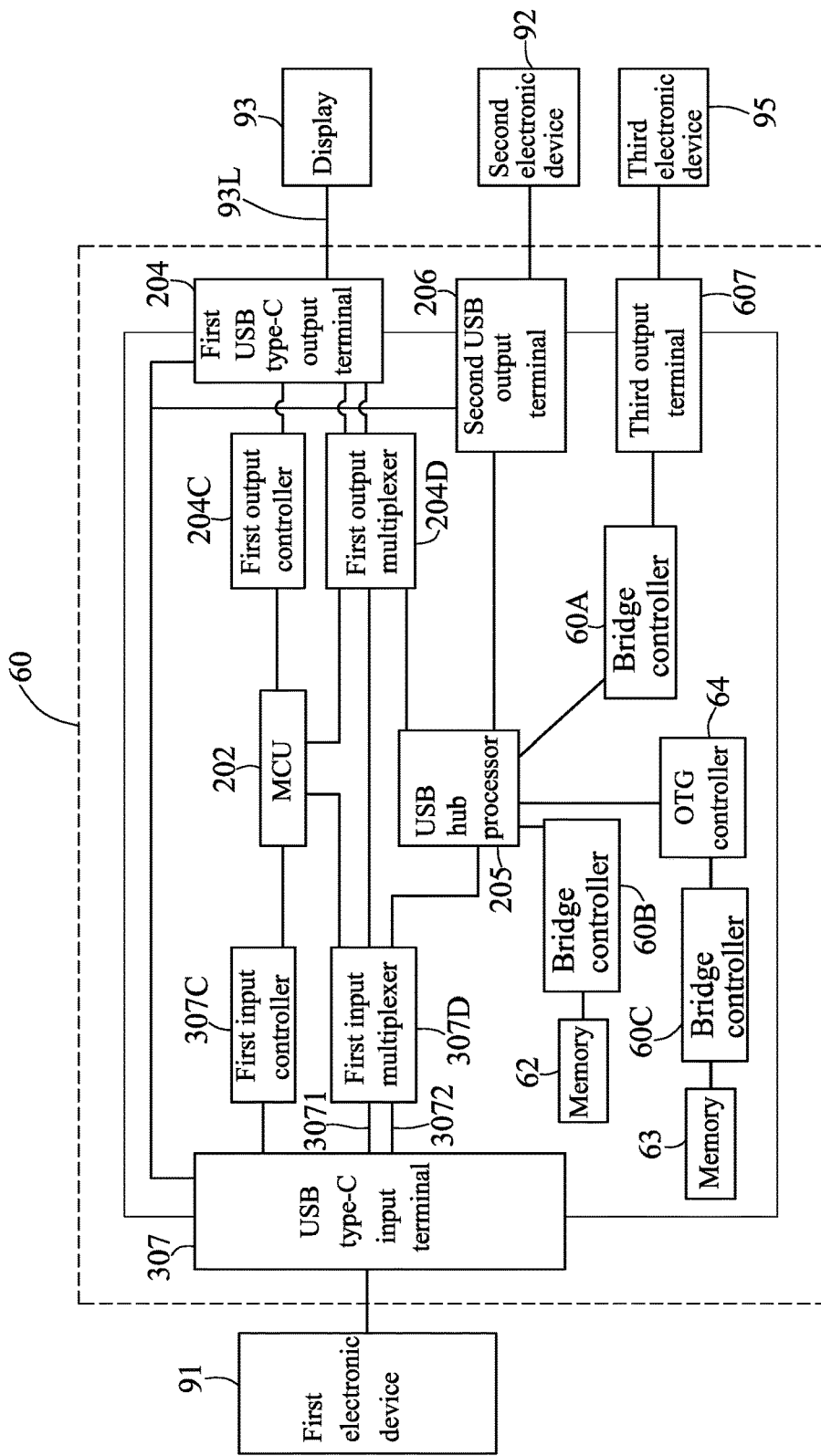
FIG. 6 illustrates a schematic diagram of a hub 60 with fifth embodiment of the present invention.

Please refer to FIG. 6. FIG. 6 illustrates a schematic diagram of a hub 60 with fifth embodiment of the present invention. The difference between the hub 60 and the hub 30 is the hub 60 further comprises a plurality of bridge controller (There are three bridge controllers 60A, 60B, 60C in FIG. 6), a third output terminal 607, at least one memory (There are two memories 62, 63) and a OTG controller 64. One of the bridge controller 60A is electrically connected between the USB hub processor 205 and the third output terminal 607, and the bridge controller 60A is adapted for transformation of signals in various formats. For example, the bridge controller 60A is able to transform the output signal of the USB hub processor 205 into another signal in a different format, and then the signal is transmitted to an external third electronic device 95, such as a card reader. In addition, the bridge controller 60B is connected to the memory 62. The hub 60 provides a data storage function as a portable hard disk due to the memory 62. Moreover, the OTG controller 64 is electrically connected to the USB hub processor 205, and the bridge controller 60C is electrically connected between the OTG controller 64 and a memory 62. The OTG controller 64 is to support the standard of USB On-The-Go. Thus, the memory 63 and the third electronic device 95 can perform data transmission directly, without the other computer apparatus.

Although the description above contains many specifics, these are merely provided to illustrate the invention and should not be construed as limitations of the invention's scope. Thus, it will be apparent to those skilled, in the art that various modifications and variations can be made in the system and processes of the present invention without departing from the spirit or scope of the invention.

What is claimed is:

1. A hub electrically connected to a first electronic device and a display outside the hub, the display connected to the hub via a first type-C transmission line, and the hub comprising:
   a circuit board;
   a MCU disposed on the circuit board;
   a front type-C transmission line electrically connected to the first electronic device, the front type-C transmission line comprising a power transmission line, a first data transmission line set and a second data transmission line set, and the power transmission line, the first data transmission line set and the second data transmission line set are extended on the circuit board;
   a first USB type-C output terminal electrically connected between the power transmission line and the first type-C transmission line;
   a first input controller disposed on the circuit board and electrically connected to the MCU and the first electronic device;
   a first output controller disposed on the circuit board and electrically connected between the MCU and the first USB type-C output terminal, and a connecting status of the first type-C transmission line and the first USB type-C output terminal is detected by the first output controller;
   a first output multiplexer disposed on the circuit board and electrically connected to the MCU and the first data transmission line set, an output terminal of the first output multiplexer electrically connected to the first USB type-C output terminal;
   a USB hub processor connected between the second data transmission line set and the first output multiplexer;
   wherein when the connecting status of the first type-C transmission line and the first USB type-C output terminal is transmitted to the MCU by the first output controller, the first output multiplexer is adjusted by the MCU.

2. The hub of claim 1, further comprising a second USB output terminal electrically connected a second electronic device being outside the hub and the USB hub processor.

3. The hub of claim 2, wherein the power transmission line is electrically connected to the second USB output terminal.

4. The hub of claim 1, further comprising a power module electrically connected to an external power supply being outside the hub, the power transmission line and the first USB type-C output terminal, wherein the first electronic device and the display are powered by the external power supply via the power module.

5. The hub of claim 4, wherein the external power supply is an AC power or a DC power.

6. The hub of claim 4, further comprising an energy storage element electrically connected the power module, wherein when the power module is powered by the external power supply, the energy storage element is in a charging mode, and when the power module is not powered by the external power supply, the energy storage element is in a power supply mode.

7. The hub of claim 1, further comprising a bridge controller and a third output terminal, the bridge controller electrically connected to the USB hub processor and the third output terminal, the bridge controller adapted for transformation of signals in various formats.

8. The hub of claim 7, further comprising a memory connected to the bridge controller.

9. The hub of claim 8, further comprising an OTG controller electrically connected to the USB hub processor, the bridge controller electrically connected between the OTG controller and the memory.

10. A hub electrically connected to a first electronic device and a display which are outside the hub, the first electronic device connected to the hub via a second type-C transmission line, the display connected to the hub via a first type-C transmission line, and the hub comprising:
   a circuit board;
   a MCU disposed on the circuit board;
   a USB type-C input terminal including a power transmission line, a first data transmission line set and a second data transmission line set extended on the circuit board, the USB type-C input terminal electrically connected to the second type-C transmission line;
   a first USB type-C output terminal electronic connected to the power transmission line and the first type-C transmission line;
   a first input controller disposed on the circuit board and electrically connected to the MCU and the USB type-C input terminal, and a connecting status of the second type-C transmission line and the USB type-C input terminal is detected by the first input controller;
   a first input multiplexer disposed on the circuit and electrically connected to the MCU, the first data transmission line set and the second data transmission line set;
   a first output controller disposed on the circuit board and electrically connected between the MCU and the first USB type-C output terminal, and a connecting status of the first type-C transmission line and the first USB type-C output terminal is detected by the first output controller;

a first output multiplexer disposed on the circuit board and electrically connected to the MCU and the first input multiplexer, an output terminal of the first output multiplexer electrically connected to the first USB type-C output terminal;

a USB hub processor electrically connected between the first input multiplexer and the first output multiplexer;

Wherein when the connecting status of the second type-C transmission line and the USB type-C input terminal is transmitted to the MCU by the first input controller, the first input multiplexer is adjusted by the MCU, and when the connecting status of the first type-C transmission line and the first USB type-C output terminal is transmitted to the MCU by the first output controller, the first output multiplexer is adjusted by the MCU.

11. The hub of claim 10, further comprising a second USB output terminal electrically connected a second electronic device being outside the hub and the USB hub processor.

12. The hub of claim 11, wherein the power transmission line is electrically connected to the second USB output terminal.

13. The hub of claim 10, further comprising a power module electrically connected to an external power supply being outside the hub, the power transmission line and the first USB type-C output terminal; wherein the first electronic device and the display are powered by the external power supply via the power module.

14. The hub of claim 13, wherein the external power supply is an AC power or a DC power.

15. The hub of claim 13, further comprising an energy storage element electrically connected the power module, wherein when the power module is powered by the external power supply, the energy storage element is in a charging mode, and when the power module is not powered by the external power supply, the energy storage element is in a power supply mode.

16. The hub of claim 10, further comprising a bridge controller and a third output terminal, the bridge controller electrically connected to the USB hub processor and the third output terminal, the bridge controller adapted for transformation of signals in various formats.

17. The hub of claim 16, further comprising a memory connected to the bridge controller.

18. The hub of claim 17, further comprising an OTG controller electrically connected to the USB hub processor, the bridge controller electrically connected between the OTG controller and the memory.

* * * * *